Jan. 15, 1963

R. H. TARBOX 3,073,918

SHIFT KNOB SWITCH

Filed Nov. 12, 1959

INVENTOR.
ROBERT H. TARBOX
BY Walter E. Pavlick

ATTORNEY

United States Patent Office 3,073,918
Patented Jan. 15, 1963

3,073,918
SHIFT KNOB SWITCH
Robert H. Tarbox, Toledo, Ohio, assignor to Dana Corporation, Toledo, Ohio, a corporation of Virginia
Filed Nov. 12, 1959, Ser. No. 852,406
6 Claims. (Cl. 200—6)

This invention relates to electrical switches, and more particularly to a shift knob switch for controlling a clutching or declutching operation.

Prior shift knob switches have been of the push button type or where the shift knob has been the switch actuator, it has been necessary to move the shift knob axially or swayingly in one particular direction to effect switch actuation. Further, the actuator of the prior art switches has either been disposed on top of the shift knob or been the top part of the shift knob itself. With this arrangement, the switch has been subjected to inadvertent operation as by bumping or by the operator merely resting his hand on the shift knob. Inadvertent operation of prior switches has also been caused by shocks or vibrations commonly present in the operation of motor vehicles.

An object of this invention is to resiliently mount a member of a split shift knob so that switching means mounted on the split members will be easily actuated by rockable movement of the resiliently mounted member in any direction.

Another object of this invention is to resiliently mount the lower member of the split shift knob whereby the upper member may be employed as a hand rest without effecting inadvertent switch operation.

A further object of this invention is to provide a shift knob switch which absorbs shock or vibration.

A more specific object of this invention is to provide a resilient bushing which serves as a centering spring, movably mounts a member of a split shift knob, provides electrical insulation and allows a wiping action of the switch surfaces which cleans the arc produced oxides therefrom.

Figure 1:
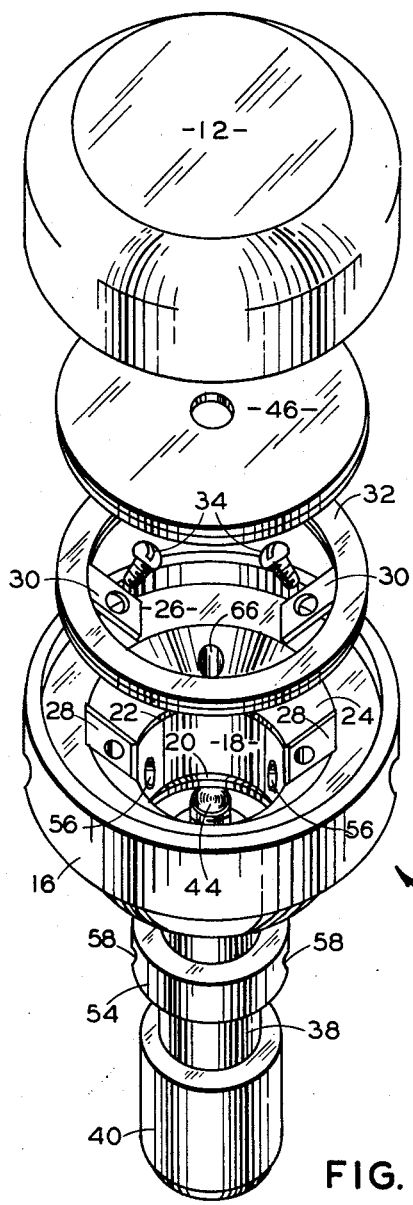
Figure 2:
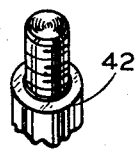
Figure 2:
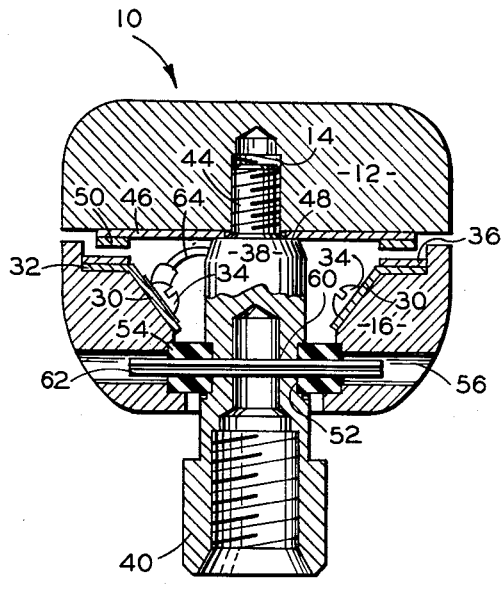

Other objects and advantages of this invention will become apparent from the following detailed description, which constitutes one preferred embodiment of this invention, when taken in connection with the accompanying drawing wherein:

FIG. 1 is an exploded perspective view of the shift knob embodying this invention; and FIG. 2 is a longitudinal sectional view of the shift knob switch illustrated in FIG. 1 in assembled position.

Referring more particularly to the drawing, a shift knob switch indicated generally at 10 comprises a substantially circular shaped upper member 12 having a threaded bore 14 extending centrally therein from the under surface thereof. A substantially circular lower member 16 having a diameter equal to that of the upper member 12 is provided with a longitudinally extending centrally disposed opening. The internal surface adjacent the bottom portion of lower member 16 is provided with an annular recess 18 defined by annular shoulders 20 and 22 disposed on either side thereof. The internal surface of the lower member 16 inclines outwardly from the upper shoulder 22 to form a conical surface 24 which terminates in a horizontal annular seating surface 26. The conical surface 24 is provided with rectangular diametrically opposed detents 28 extending the full length thereof and receiving corerspondingly inwardly inclined tabs of an electrically conductive mounting ring 32 which rests on the annular seating surface 26. The mounting ring 32 is secured to the lower member 16 by a pair of screws 34 which extend through apertures in the tabs 30 and are received in tapped holes positioned in the rectangular detent portions of the conical surface 24. An annular contact ring 36 also constructed of a suitable electrical conduction material is fixedly attached to the mounting ring 32.

Support means in the form of a stem 38 is provided with an enlarged portion 40 on the lower end thereof for fixedly mounting the stem on a shift lever 42.

The upper end of the stem 38 extends through the longitudinal opening of the lower member 16. A reduced portion in the form of a threaded stud 44 is provided on the upper end of stem 38. The threaded stud 44 extends through a centrally disposed aperture in a circular switch disk 46 and is received in the threaded bore 14 of the upper member 12. It is apparent that when the upper member 12 is threaded on the stud 44, the switch disk 46 will be firmly compressed between the upper member 12 and a shoulder 48 formed on the stem 38 by the reduced portion 44. A contact ring 50 is suitably secured to the under surface of switch disk 46 and is spaced from and overlies the contact ring 36 of the lower member 16. It is obvious that the switch disk 46 and the contact ring 50, as well as the mounting ring 32 and contact ring 36, may be constructed as an integral member if so desired.

Means is provided to mount the lower shift knob member 16 for axial, rotatable, or rockable movement in any direction. More particularly, supporting stem 38 is provided with an annular recess 52 disposed therearound at a point substantially midway between the enlarged portion 40 and the threaded stud 44. An annular member 54 of rubber or other suitable resilient insulating material is provided with an internal diameter less than the external diameter of the stem 38 and is seated within annular recess 52. The resilient annular member 54 is also positioned within the annular recess 18 of lower member 16 and has an external diameter greater than the internal diameter of shoulders 20 and 22 and is restrained from movement thereby. It is now apparent that the resilient annular member 54 insulatingly mounts the lower member 16 on stem 38 in such a manner that the lower member 16 is freely rotatable and may be moved axially, or rocked in any direction against the bias of the resilient annular member 54.

Means is provided to limit rotary movement of the lower member 16 on the stem 38 to a predetermined amount. To this end, the lower member 16 is provided with diametrically opposed transversely extending openings 56 which communicate with the annular recess 18. The annular resilient member 54 seated in the annular recess 18 is provided with openings aligned with the openings 56 and with a diametrically extending opening 60 in stem 38. A pin 62 of a length greater than the outside diameter of resilient annular member 54 but less than the diameter of the lower member 16, is received in the openings 56, 58, and 60. It should be particularly noted that the size of the openings 56, 58, and 60 is such that the pin 62 is tightly received in the annular resilient member opening 58 and stem opening 60 whereas the ends of the pin 62 are loosely received in the openings 56 of the lower member 16. It is now apparent that the lower member is still free for limited rotary movement; however, extreme rotary movement is prevented by engagement of the ends of the pin 62 with the walls of openings 56 in the lower member 16.

In operation, the shift knob switch 10 is connected in an appropriate control circuit by a lead wire 64 which extends upwardly through a longitudinal aperture 66 in lower member 16 and is electrically connected to mounting ring 32 by screw 34 in tab 30. With the parts as illustrated in FIG. 2, the shift knob switch 10 is open and the operator may conveniently rest his hand on the upper member 12 without affecting switch operation. To effect switch operation, the fingers of the hand need merely grasp the lower member 16. This effects rockable movement of the lower member 16 against the bias of annular resilient member 54 and moves the contact ring 50 into engagement with the upper contact ring 36. Hence, the circuit is complete as follows: from the control device (not shown) and power source (not shown) through lead wire 64 to mounting ring 32, lower contact ring 36, upper contact ring 50, switch disk 46, stem 38, and eventually to ground. The pin 62 limits rotary movement of the lower member so that wire 64 extending through aperture 66 in the lower member will not be pulled loose from its screw mounting 34. Since the annular resilient member 54 is of rubber or similar material, the stem 38 is electrically insulated from the lower member 16. The annular resilient member 54 additionally absorbs shock or vibration, thus preventing undesired switch operation. Since the lower member 16 is mounted for movement in any direction, a wiping action will occur upon actuation of the switch and thus keep arc produced oxide from insulating the switch surfaces.

While only a single embodiment of this invention has been shown and described, it is apparent that there may be many changes in structure as well as operation without departing from the scope of this invention as defined by the appended claims.

I claim:

1. A shift knob switch comprising an upper member having a contact ring disposed thereon, a lower member spaced from said upper member and having a contact ring disposed thereon for cooperation with said upper contact ring, support means extending through said lower member and rigidly mounting said upper member, means for rockably mounting said lower member for movement in any direction, and a pin mounted in said support means and having the ends thereof positioned for limited movement in said lower member to limit rotary movement of said lower member.

2. A shift knob switch comprising an upper member having a contact ring disposed thereon, a centrally apertured lower member spaced from said upper member and having a contact ring disposed thereon for cooperation with said upper contact ring, support means extending through said aperture and rigidly mounting said upper member, said support means and said lower member having aligned openings therein, a resilient annular member on said support means and positioned in said lower member rockably mounting said lower member on said support means whereby movement of said lower member against the bias of the said resilient means causes engagement of said upper and lower contact rings, and a pin mounted in the opening of said support means and having the ends thereof loosely received in the openings of said lower member to limit rotary movement of said lower member.

3. A shift knob switch comprising an upper member having a contact ring disposed thereon, a centrally apertured lower member spaced from said upper member and having a contact ring disposed thereon for cooperation with said upper contact ring, support means extending through the aperture in said lower member and rigidly mounting said upper member, an annular resilient member on said support means and fitted in the aperture of said lower member, whereby said lower member is resiliently mounted on said support means for rockable movement in any direction, said lower member, said annular resilient member, and said support means having aligned openings, and a pin tightly received in the openings of said support means and said resilient means and loosely received in the openings of said lower member to limit rotary movement of said lower member.

4. A shift knob switch comprising in combination an upper member having a contact ring disposed thereon, a centrally apertured lower member spaced from said upper member and having a contact ring disposed thereon for cooperation with the contact ring on said upper member, support means extending through the aperture in said lower member and rigidly mounting said upper member, and an annular, elastomeric, resilient, insulating member disposed on said support means and engaging said lower member within the central opening thereof, whereby said lower member is resiliently rockably mounted on said supporting member and insulated therefrom.

5. A shift knob switch comprising in combination an upper member having a contact ring disposed thereon, a centrally apertured lower member spaced from said upper member and having a contact ring disposed thereon for co-operation with the contact ring on said upper member, support means extending through the aperture in said lower member and rigidly mounting said upper member, an annular resilient insulating member disposed on said support means and engaging said lower member within the central opening thereof, and means carried by said insulating member and adapted to limit relative rotary movement between said upper and lower members, whereby said lower member is resiliently, rockably mounted on said supporting member and insulated therefrom.

6. A shift knob switch comprising in combination an upper member having a contact ring disposed thereon, a centrally apertured lower member spaced from said upper member and having a contact ring disposed thereon for co-operation with the contact ring on said upper member, support means extending through the aperture in said lower member and rigidly mounting said upper member, said support means and said lower member each having an annular recess therein disposed in co-operating relationship, and an annular, elastomeric, resilient, insulating member disposed in said recesses whereby said lower member is resiliently and rockably mounted on said supporting member and insulated therefrom.

References Cited in the file of this patent

UNITED STATES PATENTS

| | | |
|---|---|---|
| 1,269,400 | Dean | June 11, 1918 |
| 1,358,926 | Bates | Nov. 16, 1920 |
| 1,564,818 | Benjamin | Dec. 8, 1925 |
| 2,023,327 | Korne | Dec. 3, 1935 |
| 2,025,981 | Getty | Dec. 31, 1935 |
| 2,454,242 | Wharam et al. | Nov. 16, 1946 |
| 2,813,942 | Binder | Nov. 19, 1957 |

FOREIGN PATENTS

| | | |
|---|---|---|
| 725,291 | France | April 1932 |